(12) United States Patent
Klein

(10) Patent No.: US 7,844,961 B2
(45) Date of Patent: Nov. 30, 2010

(54) AUTOMATIC FIELD LINKING

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 1100 days.

(21) Appl. No.: 11/020,344

(22) Filed: Dec. 22, 2004

(65) Prior Publication Data

US 2006/0136888 A1    Jun. 22, 2006

(51) Int. Cl.
*G06F 9/44* (2006.01)
*G06G 7/00* (2006.01)

(52) U.S. Cl. .................. 717/162; 707/758
(58) Field of Classification Search .......... None
See application file for complete search history.

(56) References Cited

U.S. PATENT DOCUMENTS

| | | | | |
|---|---|---|---|---|
| 5,097,118 A | * | 3/1992 | Iijima | 235/492 |
| 5,303,367 A | * | 4/1994 | Leenstra et al. | 707/102 |
| 5,418,951 A | * | 5/1995 | Damashek | 707/5 |
| 5,878,213 A | * | 3/1999 | Bittinger et al. | 709/203 |
| 5,878,410 A | * | 3/1999 | Zbikowski et al. | 707/2 |
| 5,978,791 A | * | 11/1999 | Farber et al. | 707/2 |
| 5,991,758 A | * | 11/1999 | Ellard | 707/6 |
| 6,041,360 A | * | 3/2000 | Himmel et al. | 709/245 |
| 6,044,378 A | * | 3/2000 | Gladney | 707/103 R |
| 6,321,242 B1 | * | 11/2001 | Fogg et al. | 715/236 |
| 6,651,047 B1 | * | 11/2003 | Weschler, Jr. | 707/1 |
| 6,909,910 B2 | * | 6/2005 | Pappalardo et al. | 455/558 |
| 6,985,912 B2 | * | 1/2006 | Mullins et al. | 707/103 R |
| 7,200,602 B2 | * | 4/2007 | Jonas | 707/101 |
| 2003/0163299 A1 | * | 8/2003 | Iliff | 704/1 |
| 2004/0162802 A1 | * | 8/2004 | Jonas | 707/1 |

* cited by examiner

*Primary Examiner*—Michael J Yigdall
*Assistant Examiner*—Evral Bodden
(74) *Attorney, Agent, or Firm*—Kenyon & Kenyon LLP

(57) ABSTRACT

A method, system and apparatus for automatic field linking is described. In one embodiment, the invention is a method. The method includes receiving input data for a first field. The method further includes receiving input data for a second field. The method also includes comparing contents of the first field to contents of the second field. Additionally, the method includes detecting identical contents of the first field and second field. Moreover, the method includes offering an opportunity to a user to create a link between the first field and the second field. Furthermore, the method includes receiving acceptance from the user. The method also includes creating the link between the first field and the second field and storing the link between the first field and the second field in persistent storage.

26 Claims, 8 Drawing Sheets

300

310  320  330

| Timecode | Field ID | Value/contents |
|---|---|---|
|  |  |  |
|  |  |  |
|  |  |  |
|  |  |  |
| ⋮ | ⋮ | ⋮ |
|  |  |  |

FIG. 3

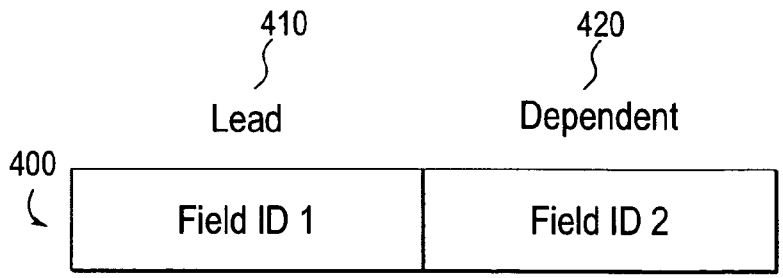
FIG. 4A
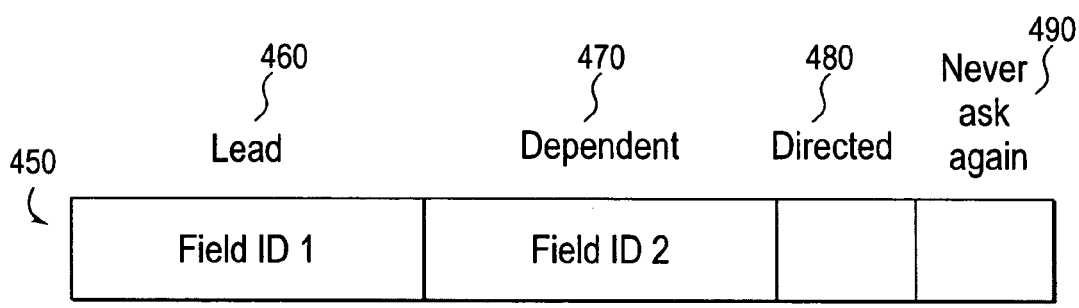
FIG. 4B
FIG. 5
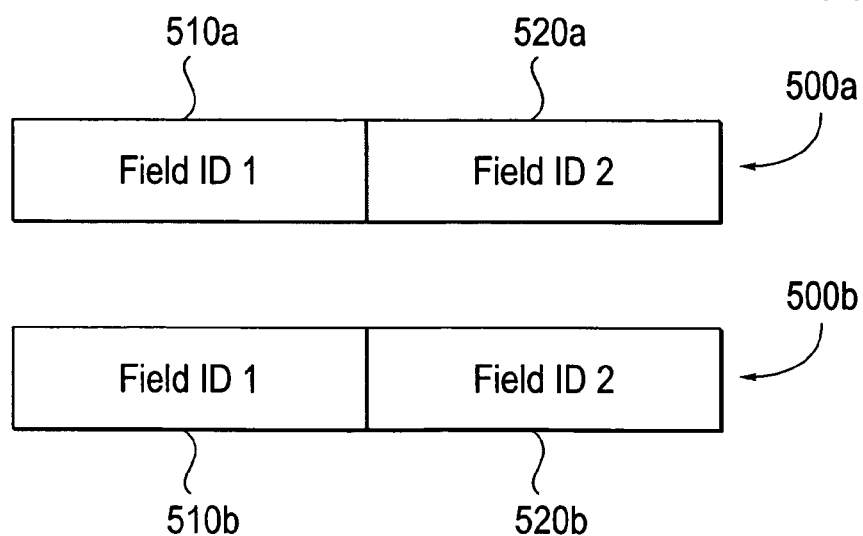

AUTOMATIC FIELD LINKING

CROSS-REFERENCE TO RELATED APPLICATION

None

TECHNICAL FIELD

The present invention is generally related to human-computer interaction and specifically related to interaction between data storage and user interfaces.

BACKGROUND

Data input or data entry involves tedious and repetitive efforts. Personnel involved in data entry typically are measured by metrics involving number of forms completed, number of keystrokes, and number of errors over a period of time. Whether this period of time is a day or an hour, the actual work involved is typically subject to errors due to lack of intellectual stimulation.

Time spent entering data often detracts from time that may be spent on more productive activity, such as helping customers, communicating with other employees, or analyzing information for example. Moreover, time spent correcting errors occurring during data entry compounds the problem, as it detracts from other activities, and is required as a result of the data entry process. Thus, any opportunity to save time in the data entry process may be useful. Moreover, opportunities to reduce effort spent by data entry personnel will typically be appreciated by such personnel. Additionally, improvements in error rates have compound benefits in terms of time spent entering data and time spent correcting data.

Part of data entry often involves entering the same information multiple times. For example, a client name may be used as part or all of a client identifier. Similarly, a billing address and a shipping address may be used as separate fields but have identical content. In such instances, eliminating the need to enter information twice may be useful.

SUMMARY

A system and method for automatic field linking is provided. In one embodiment, the invention is a method. The method includes receiving input data for a first field. The method further includes receiving input data for a second field. The method also includes comparing contents of the first field to contents of the second field. Additionally, the method includes detecting identical contents of the first field and second field. Moreover, the method includes offering an opportunity to a user to create a link between the first field and the second field. Furthermore, the method includes receiving acceptance from the user. The method also includes creating the link between the first field and the second field and storing the link between the first field and the second field in persistent storage.

In an alternate embodiment, the invention is a system. The system includes a link detection module. The system also includes a link creation module. The system may further include a processor and a memory coupled to the processor. The system may also include a bus coupled to the processor and to the memory, with the bus coupled between the processor and the memory. Moreover, the system may include a user interface coupled to the bus and a network interface coupled to the bus. Additionally, the system may include a history management module. Also, the system may include a link management and storage module. Furthermore, the system may involve links stored persistently in a database. Similarly, the system may involve links stored persistently in a personal profile. In addition, the system may include means for detecting user input and means for storing links.

In another alternate embodiment, the invention is a method. The method includes detecting a potential link between a first field and a second field. The method also includes creating a link between the first field and the second field. The method may also include receiving data input in a first field and receiving data input in a second field. Typically, the method will involve the link causing data entered in one of the first and second field to be reflected in the other of the first and second field. Moreover, the method may include prompting a user about whether to create the link. Furthermore, the method may include prompting a user to sever the link. Also, the method may involve the link being bi-directional, causing duplication of contents of the first field in the second field and duplication of contents of the second field in the first field. Similarly, the method may involve the link being directed, causing duplication of contents of the first field in the second field but not duplication of contents of the second field in the first field. Alternatively, the method may involve the link being directed, and causing duplication of contents of the second field in the first field but not duplication of contents of the first field in the second field. The method may further involve the link being recorded in a persistent manner.

Additionally, the method may involve detecting based on duplicate data in the first field and the second field occurring a predetermined number of times. The method may also involve detecting based on copying contents from one of the first or second field to the other of the first or second field more than a predetermined number of times. The method may alternatively involve detecting based on finding contents of the second field in a history of recent fields. Such a method may further involve storing recent field entries in a history of fields. Such a method may also involve discarding entries from the history of fields after a predetermined amount of time elapses from storing.

Methods of the embodiments may be performed by a processor responsive to execution by the processor of a set of instructions, with the instructions embodied in a machine-readable medium. The invention may also be a machine-readable medium embodying instructions, which, when executed by a processor, cause the processor to perform the method, in some embodiments.

It will be appreciated that the present invention is described below using specific examples that are not intended to limit the invention. The systems and methodology may be applied to a broad range of other computer applications. Therefore these and other advantages and aspects of the present invention will become apparent to those skilled in the art upon a reading of the following detailed description and a study of the drawing figures.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

FIG. 3 illustrates an embodiment of a history table of field values.

FIG. 4A illustrates an embodiment of a data representation of a link.

FIG. 4B illustrates an alternate embodiment of a data representation of a link.

FIG. 5 illustrates another alternate embodiment of a data representation of a link.

DETAILED DESCRIPTION

Figure 1:
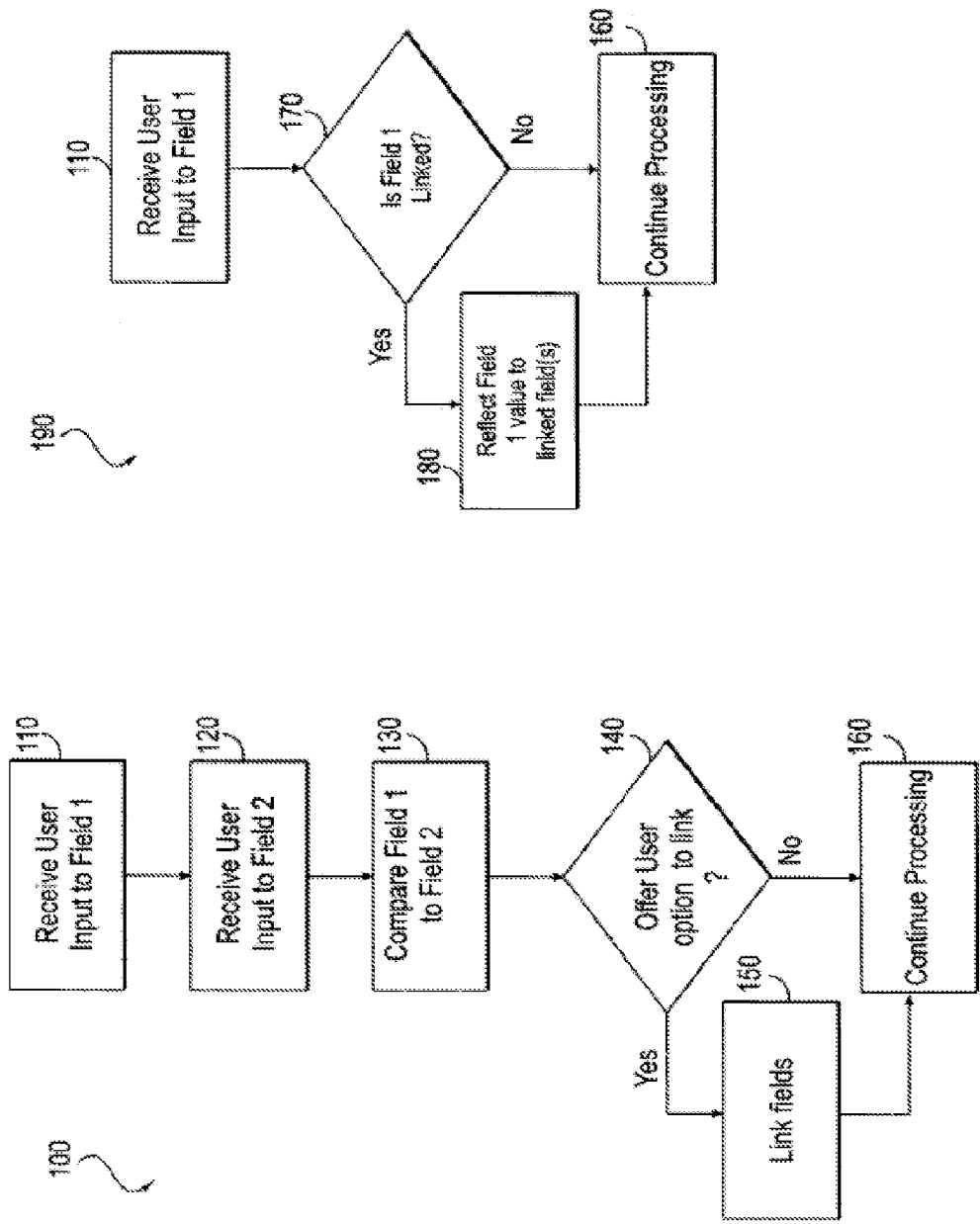
FIG. 1A illustrates an embodiment of a process of linking a pair of fields.
FIG. 1B illustrates an embodiment of a process of operating a linked field.

A method, system and apparatus for automatic field linking is described. Automatic field linking may be accomplished, in some embodiments, through detection of a potential link between fields with the same data, establishment of a link, and use of the link to reflect data between the fields. Thus, a link detection and maintenance system may be used in conjunction with a user interface and database, for example, allowing for ease of data entry.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the invention is a method. The method includes receiving input data for a first field. The method further includes receiving input data for a second field. The method also includes comparing contents of the first field to contents of the second field. Additionally, the method includes detecting identical contents of the first field and second field. Moreover, the method includes offering an opportunity to a user to create a link between the first field and the second field. Furthermore, the method includes receiving acceptance from the user. The method also includes creating the link between the first field and the second field and storing the link between the first field and the second field in persistent storage.

In an alternate embodiment, the invention is a system. The system includes a link detection module. The system also includes a link creation module. The system may further include a processor and a memory coupled to the processor. The system may also include a bus coupled to the processor and to the memory, with the bus coupled between the processor and the memory. Moreover, the system may include a user interface coupled to the bus and a network interface coupled to the bus. Additionally, the system may include a history management module. Also, the system may include a link management and storage module. Furthermore, the system may involve links stored persistently in a database. Similarly, the system may involve links stored persistently in a personal profile. In addition, the system may include means for detecting user input and means for storing links.

In another alternate embodiment, the invention is a method. The method includes detecting a potential link between a first field and a second field. The method also includes creating a link between the first field and the second field. The method may also include receiving data input in a first field and receiving data input in a second field. Typically, the method will involve the link causing data entered in one of the first and second field to be reflected in the other of the first and second field. Moreover, the method may include prompting a user about whether to create the link. Furthermore, the method may include prompting a user to sever the link. Also, the method may involve the link being bi-directional, causing duplication of contents of the first field in the second field and duplication of contents of the second field in the first field. Similarly, the method may involve the link being directed, causing duplication of contents of the first field in the second field but not duplication of contents of the second field in the first field. Alternatively, the method may involve the link being directed, and causing duplication of contents of the second field in the first field but not duplication of contents of the first field in the second field. The method may further involve the link being recorded in a persistent manner.

Additionally, the method may involve detecting based on duplicate data in the first field and the second field occurring a predetermined number of times. The method may also involve detecting based on copying contents from one of the first or second field to the other of the first or second field more than a predetermined number of times. The method may alternatively involve detecting based on finding contents of the second field in a history of recent fields. Such a method may further involve storing recent field entries in a history of fields. Such a method may also involve discarding entries from the history of fields after a predetermined amount of time elapses from storing.

Methods of the embodiments may be performed by a processor responsive to execution by the processor of a set of instructions, with the instructions embodied in a machine-readable medium. The invention may also be a machine-readable medium embodying instructions, which, when executed by a processor, cause the processor to perform the method, in some embodiments.

Note that the methods and systems are generally described as related to linking two fields. However, a single field may be linked with multiple fields, thus resulting in data reflecting from the first field to several fields, rather than merely to a second field. This may be accomplished using the methods and systems described in various embodiments herein. It may also be accomplished using extended data structures, for example, which incorporate a list of linked fields or other variations. Such variations will be apparent without undue experimentation.

Various methods and systems may implement the present invention. For example, embodiments may involve a process of receiving input and linking fields. FIG. 1A illustrates an embodiment of a process of linking a pair of fields. The process 100, in one embodiment, involves receiving user input in a first field and a second field, comparing the input data of those fields, offering the option to link the fields for future input, linking the fields and continuing processing. Process 100 may be implemented and understood as a set of modules, as may all processes described and illustrated herein. Moreover, process 100 and other processes described in this document may be rearranged, reordered, modules may be combined or subdivided, and modules may be executed in a parallel or serial fashion within the scope of the present invention.

Process 100 may be understood as a streamlined embodiment in which matches are found—it is representative of a potentially more complicated process as the process operates under certain circumstances. Process 100 begins, as illustrated, at module 110, with receipt of user input data in a first field. At module 120, user input data in a second field is received. At module 130, the data of the first field is compared to the data of the second field, and a match is found. At module 140, a user providing input data is presented the option to link the first field to the second field. If the user chooses to link the fields, the process creates the link at module 150, such as by recording the link in a table of links. After the link is established, at module 160, the process continues with input processing. Similarly, if a link is declined, at module 160, the process continues with input processing.

Thus, the process involves receiving user input into a first field and a second field, comparing the two fields and finding a match, offering the option to link the two fields and linking the two fields. As an example, if the first field includes the data "SAP" and the second field includes the same data, it may be useful to link the two fields. However, whether the link is a directed link or a bidirectional link may, for example, allow for additional flexibility. Similarly, whether other constraints are met, such as close inputs in time, may affect whether a link is offered.

Once a link is created, it may be used to ease data entry burdens. FIG. 1B illustrates an embodiment of a process of operating a linked field. Process 190 involves receipt of data in a field, detection of a link, reflection of data to a linked field (or fields) and continued processing. The process begins at module 110 (as with process 100) with receipt of data corresponding to a first field. At module 170, a determination is made as to whether the first field is subject to linkage to another field. If the first field is found to be linked to a second field (or more than one field), then at module 180, data from the first field is reflected to the second field and any other linked fields. At module 160, whether a link is found or not, the data is subject to further processing by other applications or parts of applications, for example, as in process 100.

Figure 2:
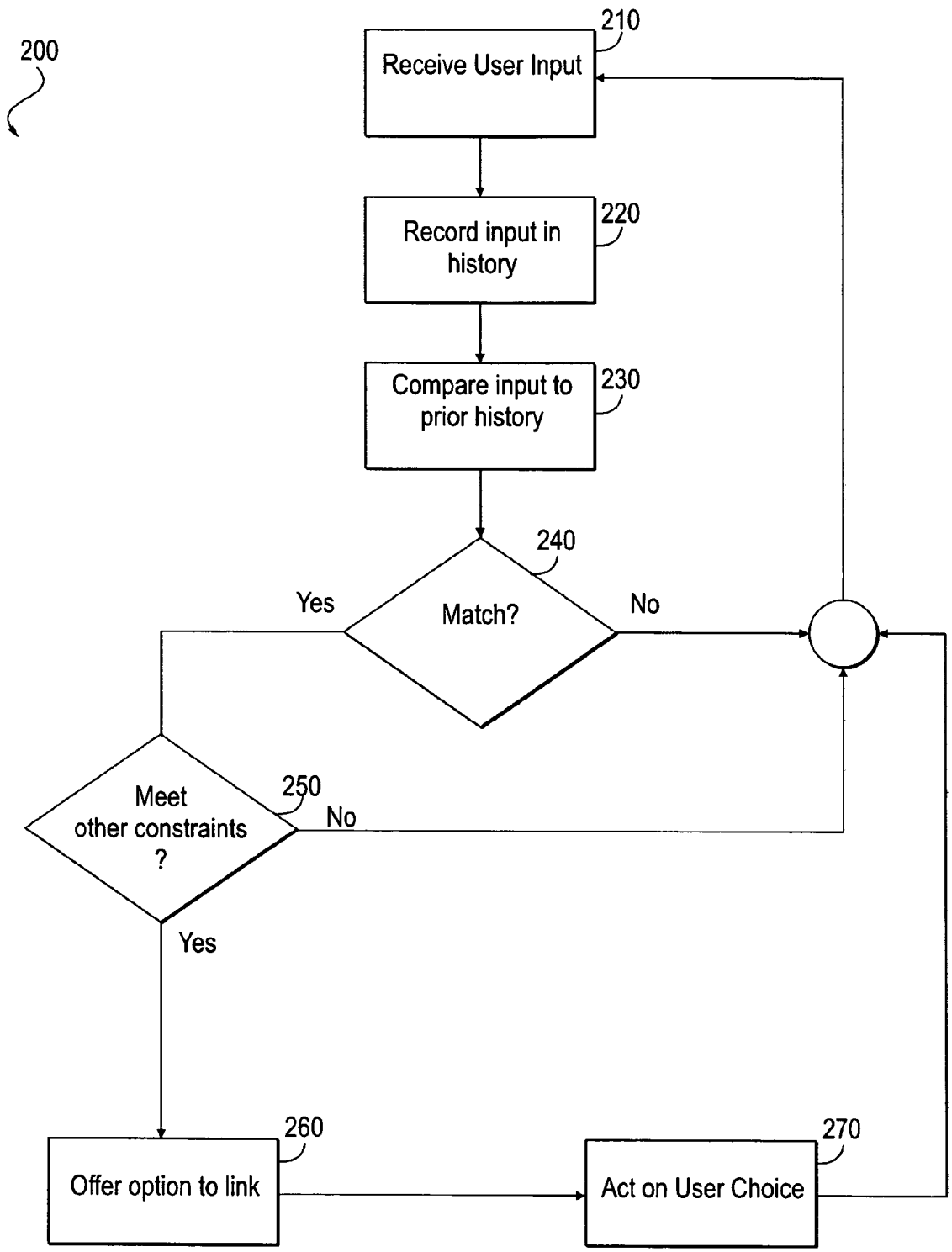
FIG. 2 illustrates an alternate embodiment of a process of linking a pair of fields.

How links are established for later use may vary. In some embodiments, the linking process may take into account additional constraints. FIG. 2 illustrates an alternate embodiment of a process of linking a pair of fields. Process 200 includes receiving user input, recording input data in a history, comparing input data to other history values, finding a match, testing other constraints, offering an option to link and acting on a user choice.

User input is received at module 210 of process 200, including data entered into a first field. The data entered is recorded in a history listing of recent data entries along with information about the field in which the data is entered and the time at which the data was entered, for example. The data is then compared to other entries in the history list (or log or table for example), to determine if the data is identical to (or essentially identical) a recent prior entry into a different field. At module 240, a determination is made as to whether a match exists between the most recent entry and another recent entry. If no match exists, the process returns to module 210 to receive further input.

If a match does exist, if another entry in the history listing has the same data, then at module 250, a determination is made as to whether other constraints are met. This may include a restriction on the number of times a match between fields must occur before a link may be created. For example, a shipping address and an office address may need to match a predetermined number of times before a link is offered. Similarly, a predetermined amount of time may be set as a limit, allowing for links if a match is found in less than the predetermined amount of time from entry of one data value to entry of the other data value. If the constraint(s) are not met, the process returns to module 210 for further input. If the constraint(s) are met, at module 260 an option to create a link is offered to the user. The user's choice is acted upon at module 270, with a choice to create a link resulting in a link and a choice to not create the link resulting in no link. Moreover, the user's choice may be more sophisticated, such as involving direction of the link for example. After acting on the user's choice, the process then returns to module 210 for further user data input.

Aspects of the methods of processes 100 and 200 may be involved in various embodiments. For example, a history record may or may not be involved, but other constraints may still be used. Similarly, various aspects may be used in conjunction with systems or apparatuses in some embodiments.

A history table or log may be implemented in a variety of ways. FIG. 3 illustrates an embodiment of a history table of field values. Table 300 represents a history table in one embodiment. Timecode 310 is a field for each entry which indicates when the data was received. Field identifier 320 is a field for each entry which indicates which field of potential user input received the input data. Value 330 is a field which includes the data actually received in the field indicated by field identifier 320. Other history implementations may be used, such as linked lists for example. Moreover, queries of databases (e.g. SELECT statements) may be used, with a requirement of a recent time or later for entry of data, to determine if matches exist. Some databases may be expected to include a timecode for information entered, allowing for a determination as to whether a match of fields is recent.

Various representations of links may also be used, whether a history list is involved or not. FIG. 4A illustrates an embodiment of a data representation of a link. Data structure 400 includes space for two fields. Lead field 410 identifies a first field that is expected to receive data. Dependent field 420 identifies a second field into which data from the first may be copied as it is entered or at the time it is entered. Data entered into the second field may be reflected into the first field as well. In some embodiments, fields are identified by field identifiers such as numbers encoded in a user interface or identifiers from a database, for example. Data structure 400 may be incorporated into an array, a database, a linked list, or some other surrounding data structure, for example.

Other representations of links may also be used. FIG. 4B illustrates an alternate embodiment of a data representation of a link. Data structure 450 includes field identifiers and flags related to status of the link. Lead field identifier 460 identifies a first field. Dependent field identifier 470 identifies a second field. Directed flag 480 indicates whether the link is directed, or may indicate a direction of the link. Never ask flag 490 may indicate that a link should be created and not queried again (such as due to a different user for example) or may indicate a link should not be created and should not be offered again, for example. Note that flag 480 and flag 490 may collectively encode an indication of whether the link exists and should be permanent, or does not exist and never should, for example.

Directed flag 480 may encode a forward, reverse or bi-directional link, for example. Thus, a forward link may link the first field to the second field (data flows from first to second) and may be encoded by a 'F' in one embodiment. A backward link may link the second field to the first field (data flows from second to first) and may be encoded by a 'R' in one embodiment. A bi-directional link may allow data flow in both directions and may be encoded by a 'B' in one embodiment. A code of 'N' may indicate no link, for example.

Another option for representation of links may be used, with a direction implied in the link. FIG. 5 illustrates another alternate embodiment of a data representation of a link. Data structure 500a represents a first link and data structure 500b represents a second link. Field 510a identifies a first field, and field 520a identifies a second field. Data structure 500a represents a link from the first field to the second field—data entered into the first field is reflected into the second field. However, data structure 500a is a directed link, which reflects data in one direction only. Field 510b identifies the second field and field 520b identifies the first field. Thus, data structure 500b represents a link from the second field to the first field. Data entered into the second field is reflected into the first field. Similarly, data structure 500b is a directed link. However, data structures 500a and 500b collectively represent a bi-directional link. Only one of these data structures (500a or 500b) need be created for a directed link, whereas both structures may be created to instantiate a bi-directional link.

The data structures of FIGS. 4A, 4B and 5 each represent potential solutions to representation of a link. Other similar data structures may be used. Moreover, various data structures may be used in conjunction with the methods of FIGS. 1 and 2, and in conjunction with the history data structures such as that of FIG. 3. Similarly, various data structures may be incorporated into embodiments of systems or apparatuses, for example.

Figure 6:
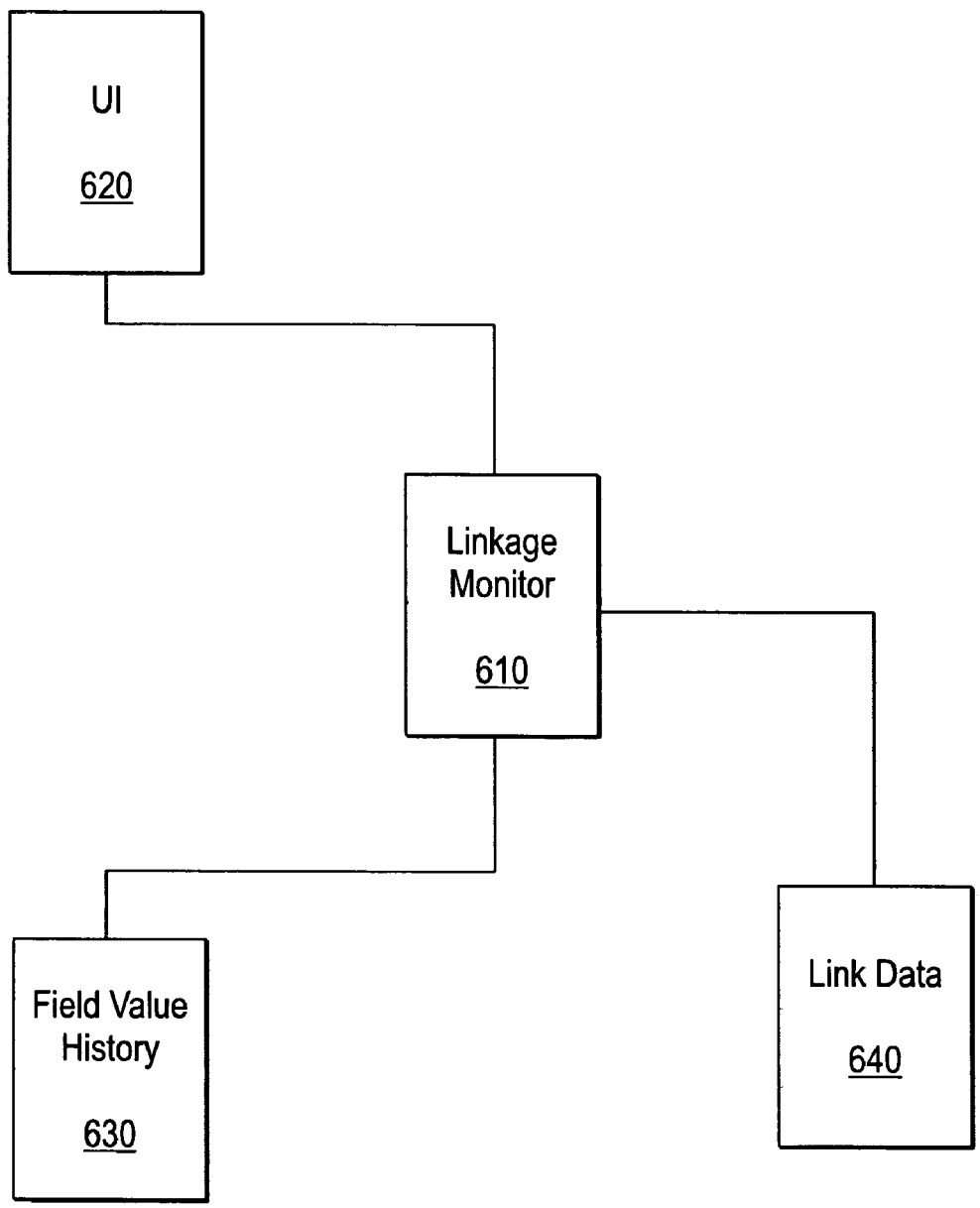
FIG. 6 illustrates an embodiment of an apparatus for managing links.

As may be expected, various embodiments of systems or apparatuses may be used to link fields for input purposes. FIG. 6 illustrates an embodiment of an apparatus for managing links. Apparatus 600 includes a link monitor, user interface, field history module and a link data module. Apparatus 600 may be implemented as a set of modules such as hardware modules or general hardware programmed to function as specific hardware modules, for example.

Linkage monitor 610 monitors links, determining whether links exist, whether data should be copied based on a link, whether a link should be offered, and whether a link should be created. Linkage monitor interfaces with user interface 620, or to an interface 620 which communicates with a separate user interface, to receive user input data and user selections related to links.

Linkage monitor 610 also interfaces with field value history module 630. Field value history module 630 maintains a data structure which represents recent data entry and related information such as field of entry and time of entry. Moreover, module 630 may handle searching or comparison to values within the data structure to determine if a data match between two or more fields exists, for example. Linkage monitor 610 may thus use module 630 to determine when matches are found, for example.

Linkage monitor 610 is also coupled to link data module 640. Module 640 may serve as an interface between some form of memory or persistent storage, for example. Module 640 may be expected to maintain a data structure of links, the links represented in the data structure in forms such as those of FIG. 4A, 4B or 5, for example. Module 640 may alternatively provide for persistent storage of link representations, and for loading or saving such representations such that linkage monitor 630 may access a local copy of link representations, and rely on existence of a persistent copy.

Figure 7:
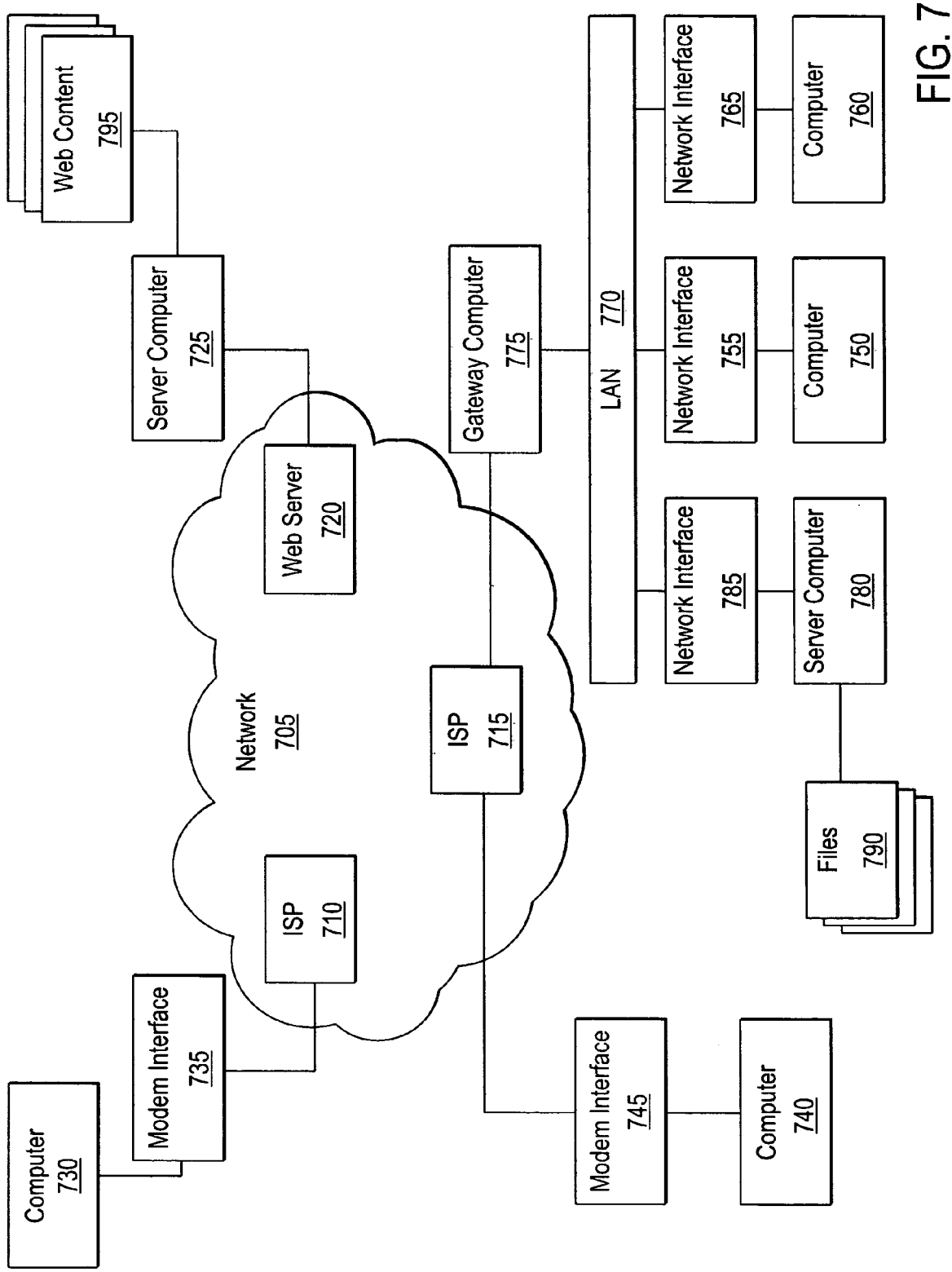
FIG. 7 illustrates an embodiment of a network of machines which may be useful with automatic field linking.
Figure 8:
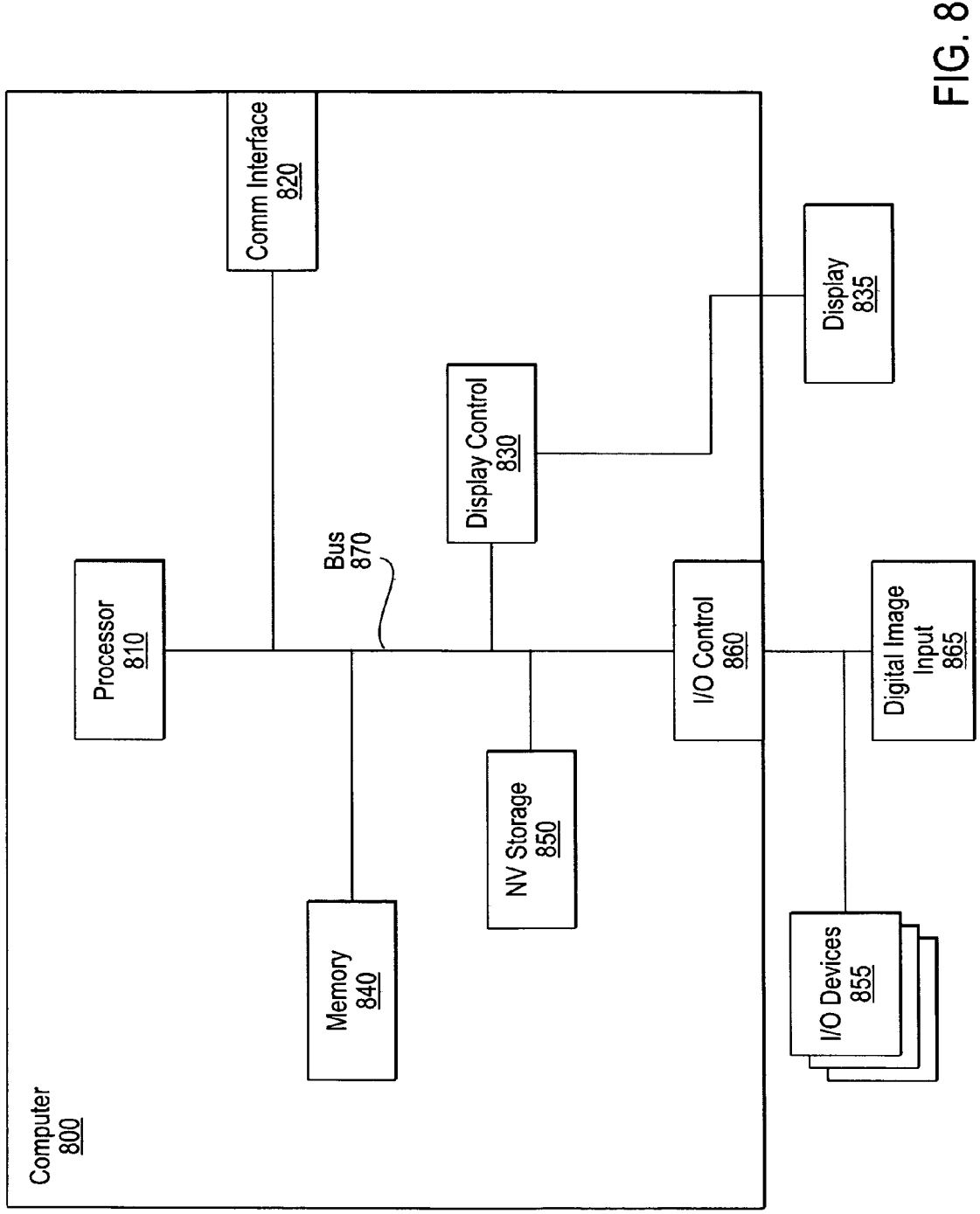
FIG. 8 illustrates an embodiment of a machine which may be useful with automatic field linking.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet. The term "internet" as used herein refers to a network of networks which uses certain protocols, such as the tcp/ip protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 740, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a conventional computer system that can be used as a client computer system or a server computer system or as a web server system. Such a computer system can be used to perform many of the functions of an internet service provider, such as ISP 710. The computer system 800 interfaces to external systems through the modem or network interface 820. It will be appreciated that the modem or network interface 820 can be considered to be part of the computer system 800. This interface 820 can be an analog modem, isdn modem, cable modem, token ring interface, satellite transmission interface (e.g. "direct PC"), or other interfaces for coupling a computer system to other computer systems.

The computer system 800 includes a processor 810, which can be a conventional microprocessor such as an Intel pentium microprocessor or Motorola power PC microprocessor. Memory 840 is coupled to the processor 810 by a bus 870. Memory 840 can be dynamic random access memory (dram) and can also include static ram (sram). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the Linux operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
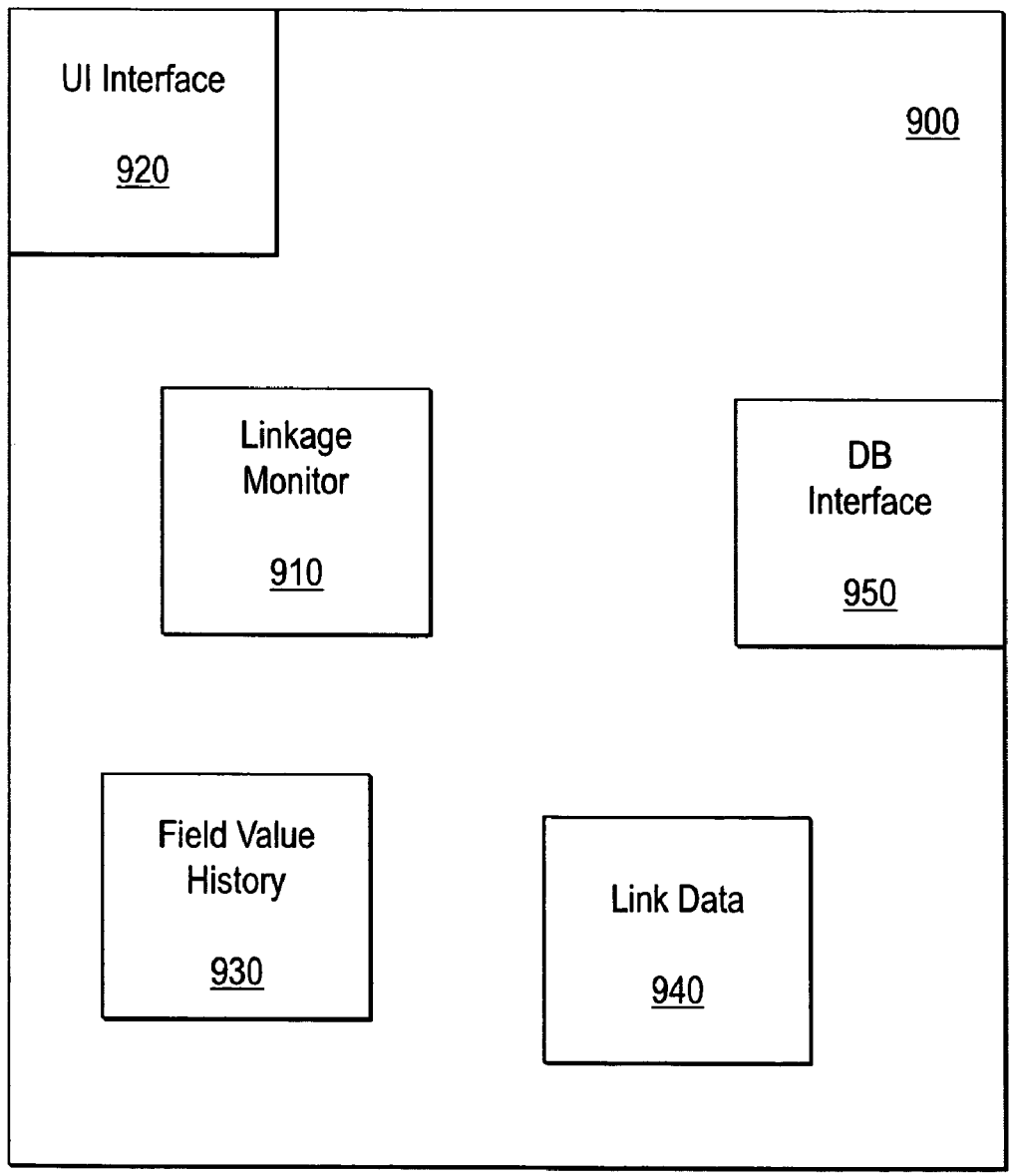
FIG. 9 illustrates an embodiment of a medium useful in conjunction with management of links.

In some embodiments, a medium may embody instructions. The instructions of the medium may be executed by a processor, causing a processor to perform a method or to program a general-purpose machine for specific operations. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals and digital signals). FIG. 9 illustrates an embodiment of a medium useful in conjunction with management of links. Medium 900 is a machine readable medium (or media) such as but not limited to a magnetic medium such as a disk or tape, an optical medium, a carrier wave, a memory such as a RAM or ROM, or other machine readable media.

Medium 900 embodies an interface to a user interface, a link monitor, a history module, a link data module and a database interface, for example. Linkage monitor 910 monitors links, determining whether links exist, whether data should be copied based on a link, whether a link should be offered, and whether a link should be created. Linkage monitor interfaces with interface 920, which communicates with a separate user interface, to receive user input data and user selections related to links.

Linkage monitor 910 also interfaces with field value history module 930. Field value history module 930 represents recent data entry and related information such as field and time of entry in a data structure, and maintains the data structure. Field value history module 930 may also handle searching or comparison to values within the data structure to determine if a data match between two or more fields exists, for example. Linkage monitor 910 may use field value history module 930 to determine when matches are found, for example.

Linkage monitor 910 is also coupled to link data module 940. Module 940 may serve as an interface between some form of memory or persistent storage, for example. Link data module 940 may maintain a data structure of links, the links represented in the data structure in forms such as those of FIG. 4A, 4B or 5, for example. Link data module 940 may also provide for persistent storage of link representations, and for loading or saving such representations such that linkage monitor 930 may access a local copy of link representations, and rely on existence of a persistent copy.

Link data module 940 may operate in conjunction with database interface 950, as may linkage monitor 910. Link data module 940 may use database interface 950 to store and retrieve representations of links in a persistent manner. Linkage monitor 910 may pass data from a user interface (obtained through interface 920) to database interface 950 for saving in a set of fields based on links, for example. Moreover, field value history module 930 may check for matches and satisfaction of time constraints through queries to a database and database interface 950.

In some embodiments, a database may be stored and accessible by a first machine, and a user interface may be implemented on a second machine. With the two machines linked, automatic field linking may be operated on one or both machines, using the user interface of the second machine and the database of the first machine, for example. Similarly, features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present invention. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

What is claimed is:

1. A method for entering data into a file through a plurality of fields of a user interface supported by a computer, each of the plurality of fields having a field identification, comprising:
   providing a history record, the history record including a plurality of entries, each of the plurality of entries including (a) a field identification, (b) a data value previously entered in a field identified by the field identification, and (c) a timecode indicating a time at which the data value was entered;
   entering a first data value in a first field;
   responsive to entering the first data value, storing the first data value, a timecode of the entering, and an identification of the first field as an entry in the history record;
   comparing the first data value with other data values contained in the plurality of entries of the history record;
   if a match is found between the first data value and a second data value in the plurality of entries of the history record, further determining if the match between the first data value and the second data value has previously happened more than a predetermined number of times,
   if the match between the first data value and the second data value has happened more than the predetermined number of times, further calculating a time difference between the entering of the first data value and entering of the second data value based on timecodes of the first and second data values;
   comparing the time difference with a predetermined threshold value; and
   if the time difference is less than the threshold value, creating a link between the first field and the second field in the file, the link causing data subsequently entered in one of the first and second field to be reflected in the other of the first and second field.

2. The method of claim 1, further comprising:
   prompting a user about whether to create the link.

3. The method of claim 2, further comprising:
prompting a user to sever the link.

4. The method of claim 1, wherein:
the link is bi-directional, causing duplication of contents of the first field in the second field and duplication of contents of the second field in the first field.

5. The method of claim 1, wherein:
the link is uni-directional from the first field to the second field, causing duplication of contents of the first field in the second field but not duplication of contents of the second field in the first field.

6. The method of claim 1, wherein:
the link is uni-directional from the second field to the first field, causing duplication of contents of the second field in the first field but not duplication of contents of the first field in the second field.

7. The method of claim 1, further comprising:
discarding entries from the history record after a predetermined amount of time elapses from storing.

8. The method of claim 1, wherein:
the match is based on duplicate data in the first field and the second field occurring a predetermined number of times.

9. The method of claim 1, wherein:
the link is recorded in a persistent manner.

10. A system, comprising:
a processor;
a user interface device;
a memory coupled to the processor, the processor adapted to perform a method for entering data into a file through a plurality of fields via the user interface device, each of the plurality of fields having a field identification, comprising:
    providing a history record, the history record including a plurality of entries, each of the plurality of entries including (a) a field identification (b) a data value previously entered in a field identified by the field identification, and (c) a timecode indicating a time at which the data value was entered;
    entering a first data value in a first field;
    responsive to entering the first data value, storing the first data value, a timecode of the entering, and an identification of the first field as an entry in the history record;
    comparing the first data value with other data values contained in the plurality of entries of the history record;
    if a match is found between the first data value and a second data value in the plurality of entries of the history record, further determining if the match between the first data value and the second data value has previously happened more than a predetermined number of times,
    if the match between the first data value and the second data value has happened more than the predetermined number of times, further calculating a time difference between the entering of the first data value and entering of the second data value based on timecodes of the first and second data values;
    comparing the time difference with a predetermined threshold value; and
    if the time difference is less than the threshold value, creating a link between the first field and the second field in the file, the link causing data subsequently entered in one of the first and second field to be reflected in the other of the first and second field.

11. The system of claim 10, wherein:
the link is stored persistently in a database.

12. The system of claim 10, wherein:
the link is stored persistently in a personal profile.

13. The system of claim 10, further comprising:
means for detecting user input; and means for storing links.

14. The method of claim 1, wherein the each of the plurality of entries further includes a time code denoting a time on which the data value associated with a field of the field identification in the each of the plurality of entries is entered.

15. The method of claim 1, wherein the determining is further based on a time code of a matching entry being less than a pre-determined amount.

16. The method of claim 1, wherein the history record includes one or more entries that has a same field identification.

17. The method of claim 1, wherein the determining of a match is based on a substantial approximation between the first data value and the second data value.

18. A machine-readable medium having stored thereon executable codes that when executed, are capable of performing a method for entering data into a file through a plurality of fields via a user interface supported by a computer, each of the plurality of fields having a field identification, comprising:
    providing a history record, the history record including a plurality of entries, each of the plurality of entries including (a) a field identification, (b) a data value previously entered in a field identified by the field identification, and (c) a timecode indicating a time at which the data value was entered;
    entering a first data value in a first field;
    responsive to entering the first data value, storing the first data value, a timecode of the entering, and an identification of the first field as an entry in the history record;
    comparing the first data value with data values contained in the plurality of entries of the history record;
    if a match is found between the first data value and a second data value in the plurality of entries of the history record, further determining if the match between the first data value and the second data value has previously happened more than a predetermined number of times,
    if the match between the first data value and the second data value has happened more than the predetermined number of times, further calculating a time difference between the entering of the first data value and entering of the second data value based on timecodes of the first and second data values;
    comparing the time difference with a predetermined threshold value; and
    if the time difference is less than the threshold value, creating a link between the first field and the second field in the field, the link causing data subsequently entered in one of the first and second field to be reflected in the other of the first and second field.

19. The method of claim 1, further comprising:
entering new data in the first field;
determining if the first field is linked to the second field;
if so, copying the entered new data to the second field.

20. A method of claim 1, further comprising:
entering new data in the second field;
determining if the second field is linked to the first field;
if so, copying the entered new data to the first field.

21. A computer-implemented method for entering data into a database via a user interface, the database including data fields for storing data, a field history log for storing a history of data previously entered into the data fields, and a link data module for storing link data objects representing links between different data fields, comprising:

entering, via the user interface, a first data value into a first data field of the database;

storing the first data value, an identification of the first data field, and a time code of entering the first data value as a new item in the field history log;

comparing the first data value with data values already stored in other items of the field history log; and if a match is found between the first data value and a second data value, further determining if the match between the first data value and the second data value has previously happened more than a predetermined number of times, if the match between the first data value and the second data value has happened more than the predetermined number of times, further calculating a time difference between the entering of the first data value and entering of the second data value based on timecodes of the first and second data values;

comparing the time difference with a predetermined threshold value; and if the time difference is less than the threshold value, creating a link data object in the link data module as a link between the first data field and the second data field.

22. The method of claim 21, further comprising:

entering new data value in the first data field;

determining if the first data field is linked to the second data field;

if so, copying the entered new data value to the second data field.

23. The method of claim 21, further comprising:

before creating the link data object, determining a time difference between the entering of the first data value and entering of the second data value;

comparing the time difference with a predetermined threshold value;

if the time difference is less than the threshold value, creating a link data object in the link data module as a link between the first data field and the second data field.

24. The method of claim 21, wherein:

the link is bi-directional, causing duplication of contents of the first field in the second field and duplication of contents of the second field in the first field.

25. The method of claim 21, wherein:

the link is uni-directional from the first field to the second field, causing duplication of contents of the first field in the second field but not duplication of contents of the second field in the first field.

26. The method of claim 21, wherein:

the link is uni-directional from the second field to the first field, causing duplication of contents of the second field in the first field but not duplication of contents of the first field in the second field.

* * * * *